C. A. J. ALBERT.
SYSTEM OF LUBRICATION.
APPLICATION FILED FEB. 28, 1908.
977,255.
Patented Nov. 29, 1910.
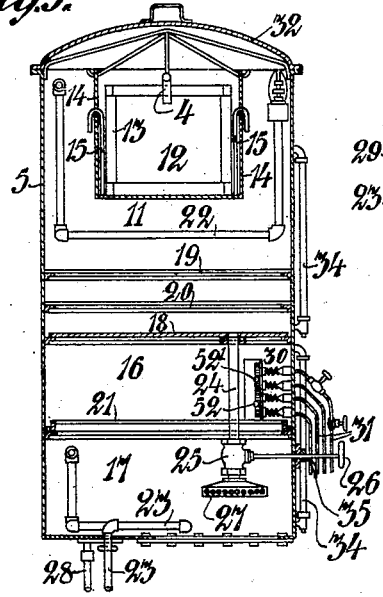
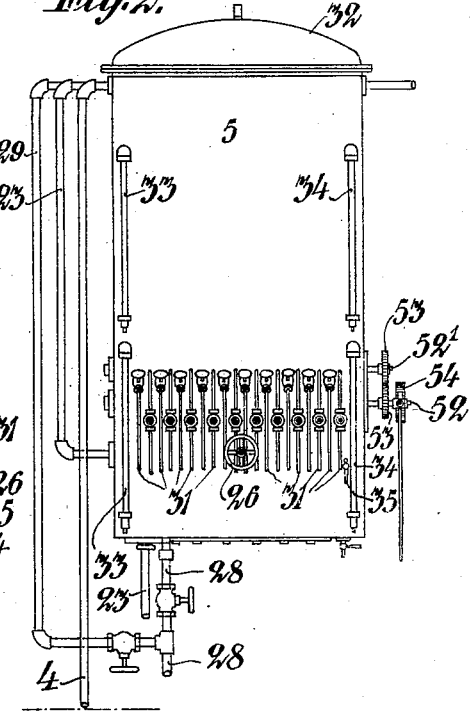
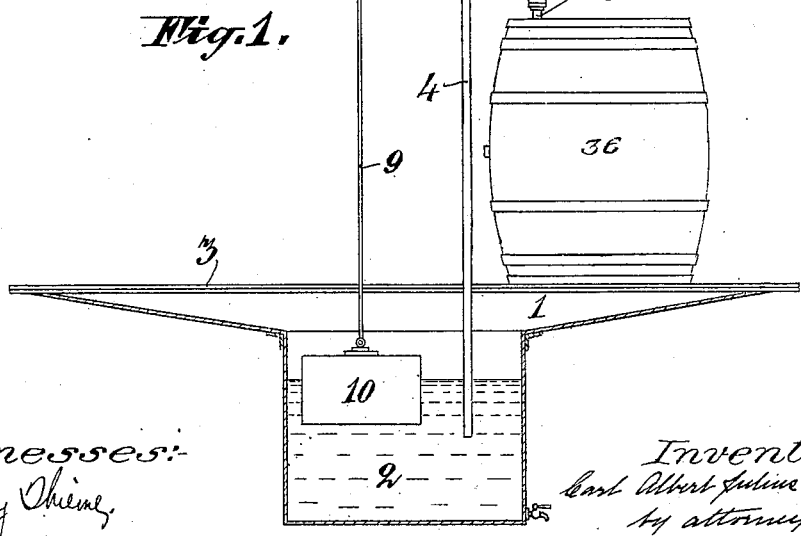
Witnesses:-
Henry Thieme,
F. George Barry.
Inventor:-
Carl Albert Julius Albert
by attorneys

UNITED STATES PATENT OFFICE.

CARL ALBERT JULIUS ALBERT, OF KVILLEBÄCKSVÄGEN, GOTTENBORG, SWEDEN.

SYSTEM OF LUBRICATION.

977,255.   Specification of Letters Patent.   Patented Nov. 29, 1910.

Original application filed June 1, 1906, Serial No. 319,670. Divided and this application filed February 28, 1908. Serial No. 418,204.

*To all whom it may concern:*

Be it known that I, CARL ALBERT JULIUS ALBERT, a subject of the King of Sweden, and resident of Kvillebäcksvägen, Gottenborg, in the Kingdom of Sweden, have invented certain new and useful Improvements in Systems of Lubrication, of which the following is a specification, reference being had therein to the accompanying drawing.

This application is a division of application Serial No. 319,670 filed June 1, 1906, and relates to means for catching and purifying waste oil from steam engines and the like and distributing the same in purified condition to the several parts of the engine to be lubricated. The said oil is caught in a tank or receptacle of suitable form placed under the engine in question. From the said tank the oil is transferred in a suitable manner to the purifying apparatus itself and, having been purified in the same it is transferred in controllable quantities and in an entirely automatic manner to the parts of the engine to be lubricated. The said purifying apparatus consists of a tank divided into three special chambers, situated one above the other. In the top chamber a purifying box is suspended, provided with vertical filters. The impure oil, having passed through the said filters, is drawn by wicks over into the top chamber. This is provided with heating tubes and with a plurality of filters. The oil is heated in the chamber last mentioned to 40° to 55° centigrade, and passes through the filters and is then transferred to the bottom chamber of the tank, which is provided with inlets for water as well as for steam. The oil is heated in the said chamber to 50° to 65° centigrade and is washed by means of a solution of common salt. From the bottom chamber the oil is forced by the pressure exerted upon the same by the oil in the top chamber, into the central chamber, passing through a double filter, separating the central chamber and the bottom chamber and effecting the final purifying operation. From the central chamber the purified oil is then fed automatically by special measuring devices to the different parts of the engine to be lubricated. Consequently, as seen from the above, the purifying operation consists in the caught oil being first filtered, then heated to 40° to 55° centigrade, then filtered again, thereupon washed by means of water and common salt (a solution of common salt), then heated to 50° to 65° centigrade and finally filtered.

A practical embodiment of my invention is represented in the accompanying drawings, in which, Figure 1 is a front view of the oil supply reservoir and a vertical section of the portion of the apparatus which receives the drip from the engine and from which the oil is drawn to the purifying tank. Fig. 2 is a view in front elevation of the purifying tank. Fig. 3 is a vertical section through the purifying tank from front to rear.

A funnel-like vessel, denoted by 1, is placed under the steam engine for catching the used impure oil. From the said funnel-like vessel the oil runs down into a tank 2, placed under the floor 3. From the tank 2, a pipe 4 leads upwardly to the purifying tank 5, the said pipe 4 having interposed therein an injector 6 of the well known construction, to which steam is supplied through a pipe 7 provided with a cock or valve 8. The handle of the cock or valve 8 is connected by a rod 9 with a float 10 resting on or in the oil in the tank 2. The oil is transferred from the tank 2 through the pipe 4, into the apparatus 5 by the steam allowed to enter the injector 6, which injector is caused to operate when the cock 8 is opened by the rise of the float 10 when the oil has risen to a certain level.

The purifying tank 5 is divided into three chambers. In the top chamber 11 a box 12 is suspended into which the oil is led through the pipe 4. The said box has double walls 13, 14, the inner wall 13 consisting of filters of well known or suitable form, vertically arranged. After the oil has passed through these vertical filters 13, it is drawn up by capillary attraction by wicks 15, which are mounted in the space between the filter wall and the outer wall 14 and from which wicks the oil drops into the top chamber 11 of the tank. The top chamber 11 and the central chamber 16 of the purifying tank are separated by a solid bottom 18. In the top chamber 11 two single filters 19 and 20 are mounted in a detachable manner. The central chamber 16 and the lower chamber 17 of the tank are separated by a double filter 21.

In the top chamber 11, a steam pipe 22 is provided for heating the oil, said pipe being connected with a pipe 23, which passes through the bottom chamber 17. The chambers 11 and 17 communicate through a pipe 24, provided with a cock or valve 25, operated by means of a wheel 26, the lower end of said pipe 24 being provided with a strainer 27. In the chamber 17 the oil may be subjected to a washing operation as well as a heating operation. The washing operation is conveniently effected by means of common salt put into the chamber and water introduced through a pipe 28 having a branch 29 leading to the top chamber 11 and the heating of the chamber 17 to a temperature of from 50° to 65° centigrade is effected by the steam pipe 23.

Owing to the pressure from the oil in the top chamber 11, the oil in the bottom chamber 17 is forced upward through the double filter 21 and enters the central chamber 16, from which it is distributed by automatically operating measuring and lubricating mechanisms 30 into pipes 31 leading to the several parts of the engine to be lubricated.

The filters 19 and 20 and the bottom plate 18 can be taken out for cleaning from the top of the tank 5, after a cover 32 and the box 12 have been removed. The double filter 21 may be inserted and removed from the side of the tank through the manhole d.

Thermometers 33 are provided to indicate the temperature in the chambers 11 and 17 and gage glasses 34 are provided to indicate the levels of the oil in chambers 11 and 16 respectively. Oil can be drawn off through a cock 35 for direct lubrication if necessary.

Fresh oil is, when wanted, introduced into the apparatus from an oil supply reservoir 36 by means of the injector 6. The reservoir 36 communicates with the pipe 4 leading from the tank 2 to the tank 5, by means of a branch pipe 37. The oil is forced into the purifying box 12, as hereinbefore described, by the action of the injector 6 and from the box 12 it passes through the top chamber 11. A valve 39 located in the branch pipe 37 and, if necessary, a valve 61 in the pipe 4, may be shut to cut off the supply of fresh oil and oil from the tank to the purifying box, when so desired. It is understood that the several pipes are to be provided with the necessary valves or cocks as may be desired.

The measuring and distributing mechanisms are caused to operate by means of spindles 52, 52', which are rotated by a suitable mechanism, as for instance, a ratchet wheel and pawl mechanism driven by the engine, the ratchet wheel 54 being fixed on the spindle 52 and the spindles 52, 52' connected by a gearing 53.

From the above it will be seen that the oil is caught, purified and distributed by one apparatus and the whole works automatically.

What I claim is:

1. In combination, an oil receptacle for receiving drip oil from an engine, measuring and distributing devices for delivering oil to the parts of the engine, an oil purifying mechanism intermediate of the drip receptacle and the measuring and distributing devices and means under the control of the oil in the drip receptacle for automatically forcing the oil from the drip receptacle to the purifying mechanism.

2. In combination, a drip receptacle for receiving the waste oil from an engine, measuring and distributing devices for distributing the oil to the parts of the engine, a supply tank of fresh oil, an oil purifying mechanism and means under the control of the oil in the drip receptacle for automatically forcing oil from the drip receptacle or supply tank to the purifying mechanism.

In witness whereof, I have hereunto signed my name in the presence of two subscribing witnesses.

CARL ALBERT JULIUS ALBERT

Witnesses:
W. I. GÜNTHER,
A. GUSTAFSSON.